(12) United States Patent
Oldani

(10) Patent No.: US 6,352,496 B1
(45) Date of Patent: Mar. 5, 2002

(54) HIGH-SPEED MILLING MACHINE WITH ROTARY TABLE

(75) Inventor: Tino Oldani, Rockford, IL (US)

(73) Assignee: IMTA Manufacturing Technology & Automation Company, Rockford, IL (US)

(*) Notice: Subject to any disclaimer, the term of this patent is extended or adjusted under 35 U.S.C. 154(b) by 0 days.

(21) Appl. No.: 09/493,995

(22) Filed: Jan. 28, 2000

(51) Int. Cl.⁷ .......................... B23Q 3/157; B23B 3/20; B23C 1/08
(52) U.S. Cl. .......................... 483/55; 82/122; 409/165; 409/168; 409/211; 409/216
(58) Field of Search .......................... 483/31, 32, 14, 483/30, 54, 55; 409/202, 212, 211, 210, 194, 191, 187, 201, 204, 207, 216, 165, 162; 82/122

(56) References Cited

U.S. PATENT DOCUMENTS

| | | | |
|---|---|---|---|
| 3,823,645 A | * 7/1974 | Sukhov et al. | 409/216 |
| RE28,766 E | 4/1976 | Villano | 90/13 C |
| 3,998,127 A | 12/1976 | Romeu | 90/14 |
| 4,020,743 A | 5/1977 | Feldcamp | 90/13.3 |
| 4,187,601 A | 2/1980 | Aldrin | 29/560 |
| 4,369,958 A | 1/1983 | Maynard | 269/61 |
| 4,373,840 A | 2/1983 | Miller, Jr. | 414/225 |
| 4,589,174 A | * 5/1986 | Allen | 409/201 X |
| 4,617,845 A | * 10/1986 | Sasano | 82/122 |
| 4,729,192 A | 3/1988 | Elsdoerfer | 51/165.71 |
| 4,951,376 A | 8/1990 | Grund | 29/568 |
| 5,020,201 A | 6/1991 | Kitamura | 29/27 C |
| 5,025,690 A | 6/1991 | Myers | 82/121 |
| 5,252,011 A | * 10/1993 | Corsi | 409/191 X |
| 5,298,844 A | 3/1994 | Nagasaki et al. | 318/568.11 |
| 5,669,867 A | 9/1997 | Hoppe | 483/55 |
| 5,909,988 A | 6/1999 | Hoppe et al. | 409/198 |
| 5,919,014 A | * 7/1999 | Weck et al. | 409/201 |
| 5,996,329 A | * 12/1999 | Cardenas | 409/216 X |
| 6,059,703 A | * 5/2000 | Heisel et al. | 409/201 X |

FOREIGN PATENT DOCUMENTS

DE 3308444 * 9/1984 ................... 483/22

* cited by examiner

*Primary Examiner*—William Briggs
(74) *Attorney, Agent, or Firm*—Leydig, Voit & Mayer, Ltd

(57) ABSTRACT

A milling machine includes a bi-directional, variable speed, rotary workpiece-holding table, a table drive sized to achieve relatively high acceleration and deceleration rates, a cutting tool mounted to a single or dual axis head, and a control system adapted to achieve a high degree of tool position and table rotational position accuracy cooperating to permit high-speed machining operations, including substantially dome-shaped parts characterized by circumferential surface portions interrupted by radial wall portions. A dual table drive and interchangeable head arrangement make the machine also suitable for conventional turret lathe operations.

7 Claims, 9 Drawing Sheets

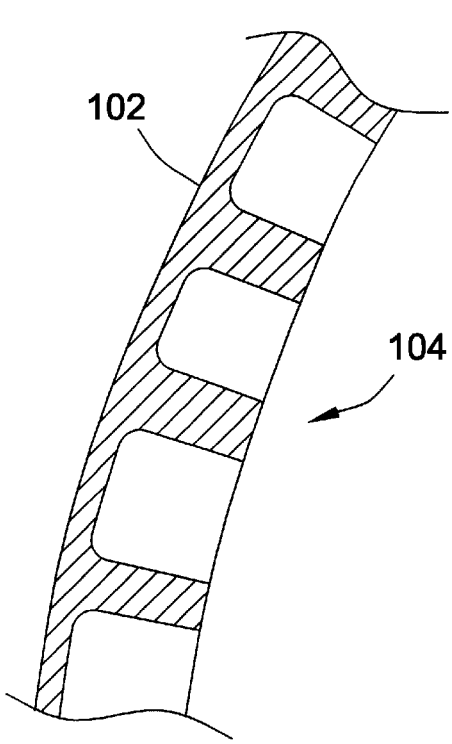
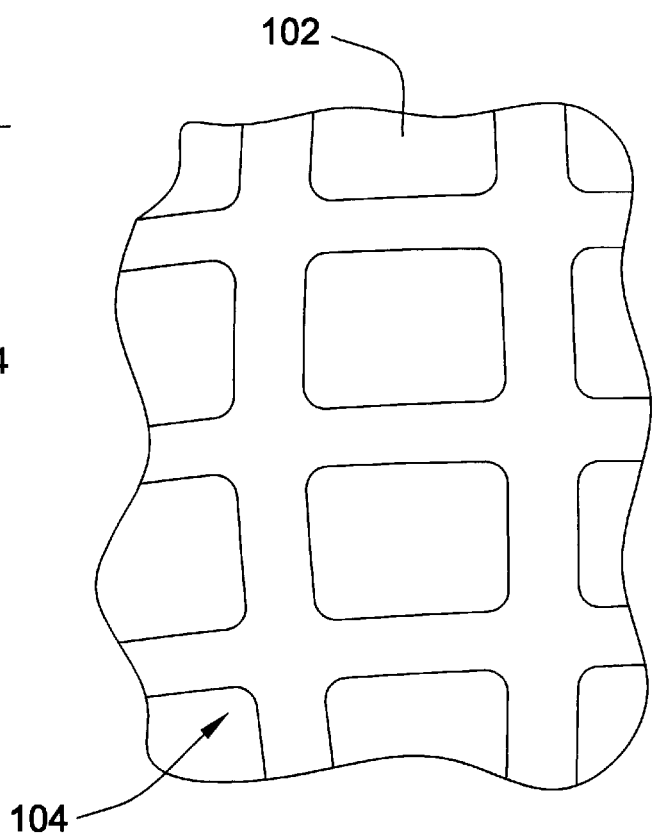
FIG. 7
FIG. 8

PRIOR ART METHOD

HIGH-SPEED MILLING MACHINE WITH ROTARY TABLE

FIELD OF THE INVENTION

This invention relates generally to milling machines, and more particularly, to high-speed CNC milling machines of a type equipped with a position controlled rotary table for holding work pieces and with a motorized cutting tool spindle.

BACKGROUND OF THE INVENTION

A conventional vertical milling machine is equipped with a horizontal table for holding a work-piece, and a power-rotated cutter for machining the work-piece. The table and the cutting tool of a typical three-axis machine are adapted for relative longitudinal movement along a horizontal X axis, relative lateral movement along a horizontal Y axis, and relative vertical movement along a Z axis. The cutting tool in such machines is typically positioned in a spindle in a vertical position, and in certain machines in a horizontal position or in an adapter for selecting either the vertical or horizontal position. In certain high-performance 4 axis machines, the cutting tool is located in a motorized spindle adapted for pivoting about a horizontal axis A, and in 5 axis machines, for rotation about a vertical axis C1.

A conventional vertical turret lathe is equipped with a horizontal table mounted for continuous rotation of the work-piece about a vertical axis C2, and a non-rotating cutting tool typically positioned in a horizontal position, or in a fixture adapted for pivoting to a fixed position about horizontal axis A. The table and cutting tool are typically adapted for relative positioning along the X and Z axes for positioning of the work piece on the table and machining of the rotating work-piece.

Numerous variations of milling machines and turret lathes are known in the art, as well as several machines that have attempted to merge the benefits of these two types of machines. One prior type of machine includes an adapter permitting removal of the turret lathe horizontal tool holder and installation of a milling vertical tool holding spindle to effect conversion from turret lathe operation to milling operation. Another prior type of machine provides for a turret lathe and a milling station in close proximity in the same machine to reduce transfer time between the two stations. Yet another type of vertical milling machine has been provided with a table mounted for rotation about a vertical axis and for swiveling about a horizontal axis. Other prior milling machines have simply been equipped with a rotary table for milling, rather than turning, cylindrical surfaces.

However, these as well as other prior machines have failed to achieve an effective combination of the machining capabilities of milling machines and turret lathes, coupled with the necessary quick response times, such that the resultant machine is suitable for precision, high-speed CNC milling operations as well as general turning purposes of a conventional turret lathe. Moreover, there is an ever-present need for improved machining apparatus and methods that permit high-speed milling of certain parts which previously could only be manufactured by other less efficient methods, such improved methods and apparatus reducing total manufacturing time, increasing machining accuracy, and/or providing for parts of a desired strength at a reduced weight.

SUMMARY OF THE INVENTION

A general aim of the present invention is to provide a new and improved high-speed CNC milling machine capable of machining certain parts which prior milling machines were incapable of machining efficiently, the parts having thus been previously manufactured by other methods.

Another objective of the invention is, for such parts, to reduce the manufacturing time, increase the dimensional accuracy, and/or reduce their weight while maintaining desired strength characteristics.

Yet another objective is to provide such a machine that is suitable for alternate operation as a conventional turret lathe.

A detailed objective is to achieve the foregoing by providing a high-speed CNC milling machine equipped with a rotary work-piece holding table that is adapted for use in high-speed milling operations.

These and other objectives and advantages of the invention will become more apparent from the following detailed description when taken in conjunction with the accompanying drawings.

Briefly, a milling machine according to the invention includes a rotary workpiece-holding table; a dual-mode table drive unit which, in one mode, is adapted for variable speed bi-directional operation with relatively high acceleration and deceleration rates and with relatively small position backlash; a single or dual axis controllable motorized cutting tool spindle releasably mounted for vertical and radial movement with respect to the table; and a control system adapted to achieve a high degree of tool and table position and speed accuracy, the control system comprising a CNC controller, table and tool axes associated sensors to provide the controller with table and tool position and speed feedback signals. I-or use as a conventional turret lathe, the motorized spindle is replaced with a conventional turret lathe tool holder and the table is rotated utilizing the second table drive mode.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 7 is an enlarged fragmentary side view of the portion of the part of FIGS. 5 and 6 taken as generally indicated at line 7—7 of FIG. 6;

FIG. 8 is a inside view of the fragmentary portion shown in FIG. 7;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
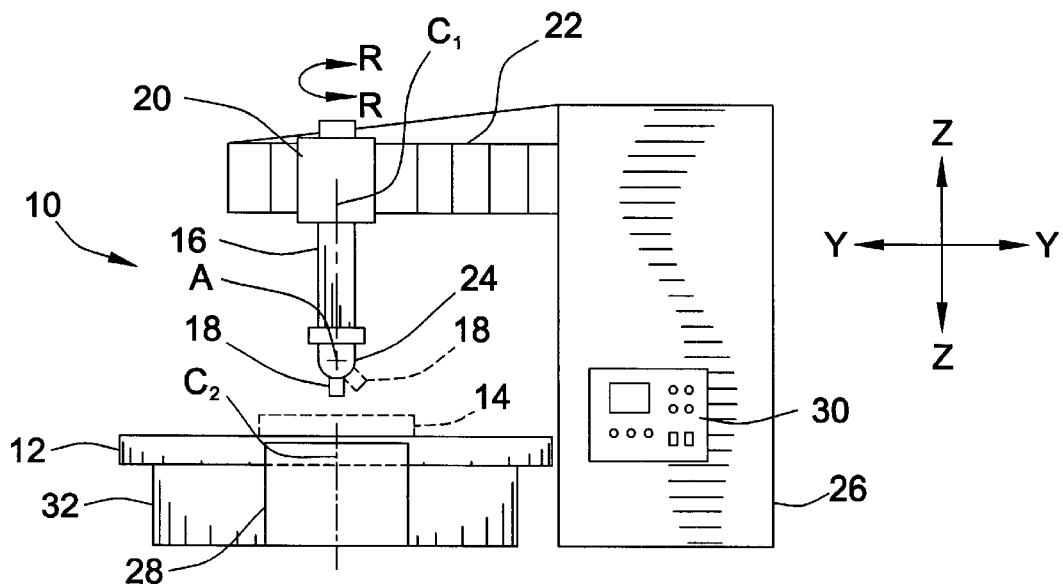
FIG. 1 is a side view of a milling machine incorporating the unique aspects of the present invention.
Figure 2:
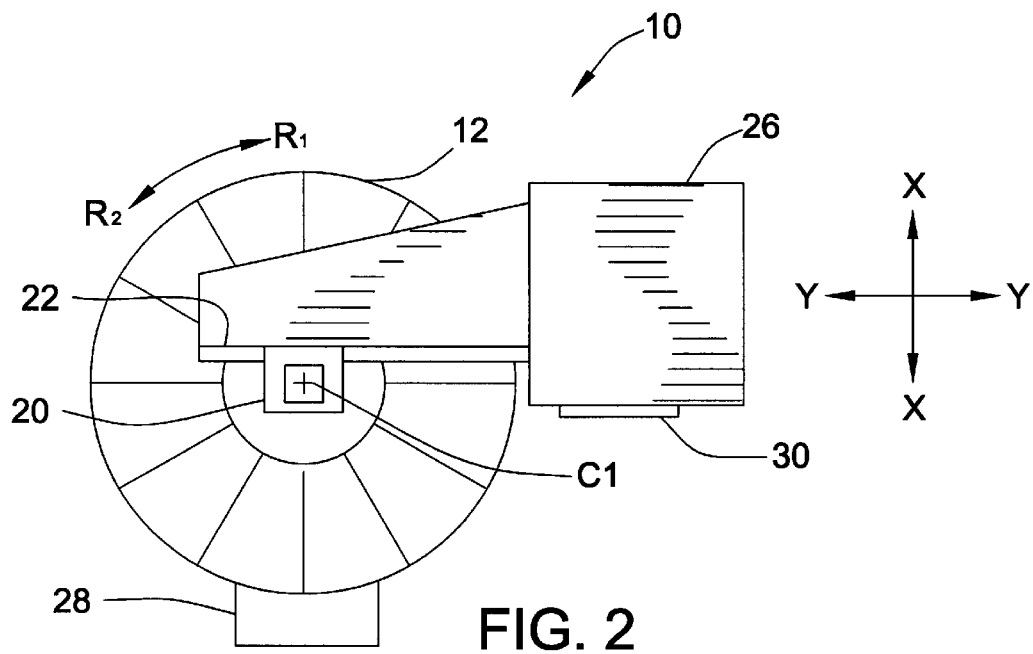
FIG. 2 is a top view of the machine of FIG. 1.

For purposes of illustration, the present invention is shown in the drawings as embodied in a milling machine 10 (FIGS. 1 and 2). Briefly, the milling machine includes a table 12 mounted on a base frame 32 for rotation about a vertical axis C2 and adapted to releasably carry a work piece 14 for rotation therewith (with the use of clamps and related clamping apparatus), and a ram 16 equipped with a milling spindle or milling head 24 that releasably carries a cutting tool 18 for machining the work piece. The ram is mounted to a carrier 20 for up and down movement along the vertical Z axis (see e.g., FIGS. 9 and 10), and the carrier is mounted to a boom 22 for back and forth lateral movement along the horizontal Y axis, the boom and carrier being supported above the table by a stationary machine frame or column 26. Movement of the ram, the carrier, and the milling head along said axes is effected by associated axis drive motors and drive units having relatively fast response time and operatively connected to and responsive to control signals from the machine controller indicated at 30.

Figure 3:
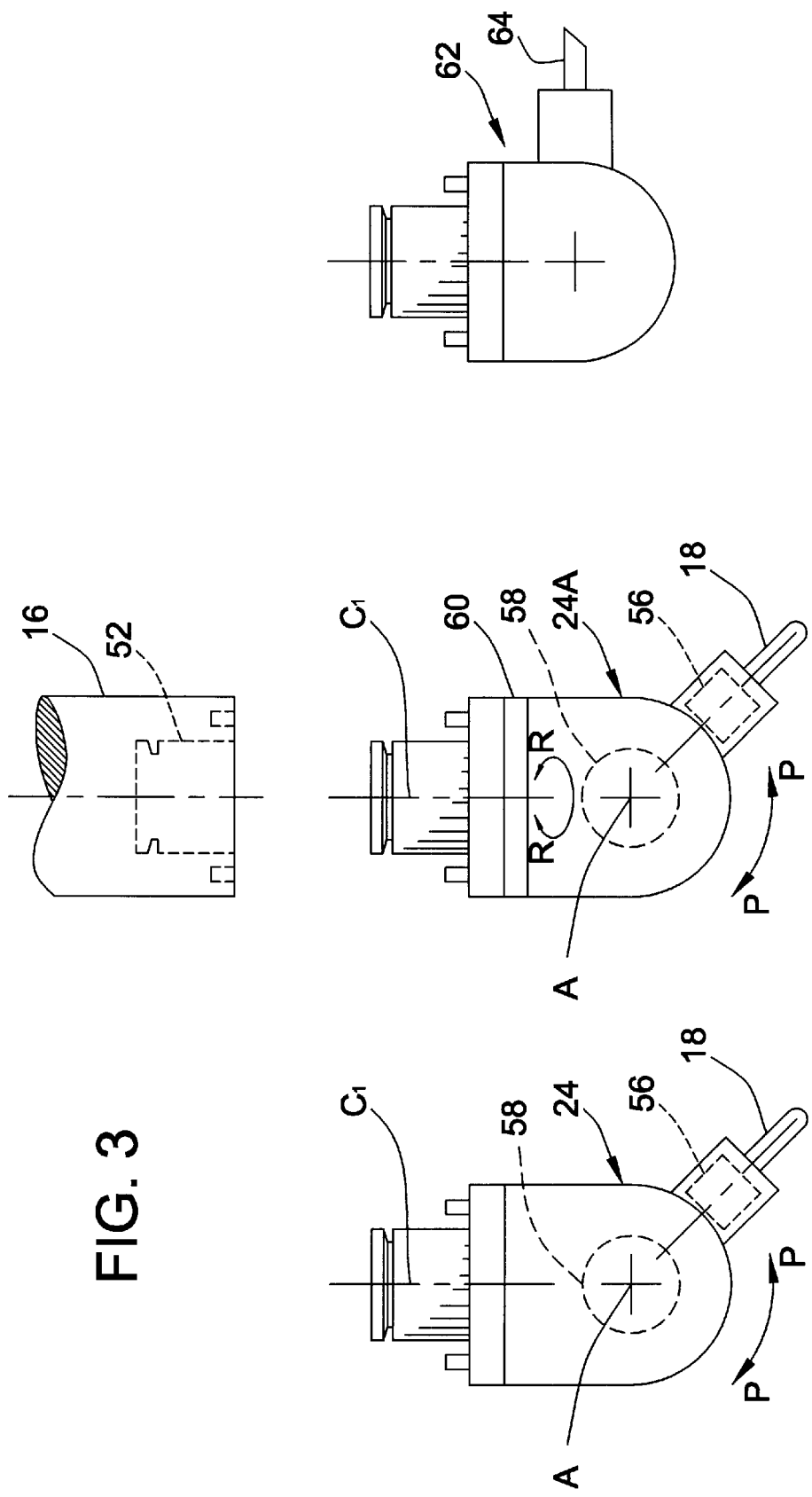
FIG. 3 is an enlarged diagrammatic side view of certain sclectable/interchangeable parts of the machine of FIG. 1.

In general, the milling head 24 provides for pivoting of the cutting tool 18 about the horizontal axis A such as indicated in FIG. 1 in which an alternate cutting tool 18 position is shown in dashed lines, and optionally for rotation of the tool about the vertical C1 axis such as generally indicated by arrow R—R. To this end, the milling head includes an electric motorized spindle for power rotation of the cutting tool 18, the electric motor 56 being located for pivoting on axes A and rotation about C1 therewith. In carrying out this aspect, the lower end of the ram 16 is equipped with a coupling 52 (FIG. 3) for releasably receiving one of two alternate milling heads 24 and 24A. Milling head 24 includes an A axis electric drive motor 58 for pivoting the motorized spindle and cutting tool about the A axis (as indicated by the arrow P—P) for single-axis tool control, and milling head 24A provides for dual-axis tool control with electric drive axis motor 58, and motor 60 for rotation of the spindle and cutting tool about the C1 axis. As with the other drive axis motors, electric motors 56. 58 and 60 are operatively connected to the controller, and are sized for precision control and fast response characteristics.

Table power drive means includes a drive unit generally indicated at 28 for rotating the table 12 about axis C2. The table drive unit includes one or more drive axis motors operatively connected to and responsive to control signals from the controller 30, and one or more associated output gears engaging, for example, a ring gear 44 connected under or on the outside diameter of the table for operative rotary driving engagement with the table. To provide for angular positioning, and rotational control of the table during milling operations, the drive unit 28 is adapted for variable speed operation, from zero RPM to relatively high-speed rotation of the table 12 in both R1 and R2 directions (i.e., forward and reverse) about the C2 axis, with the drive motors being sized for relatively high acceleration and deceleration rates.

In preferred embodiments, to achieve accurate table rotational position control, the table drive unit 28 includes a backlash elimination system, or a backlash reducing system operating in association with backlash compensation in the controller 30, the actual known or measurable backlash information being provided to the controller which includes software provision for compensating for such backlash when executing changes in the direction of table rotation. In the embodiment shown, backlash elimination is accomplished by utilizing a C2 axis drive unit that includes an output gear 42 (FIG. 3) biased radially inwardly toward axis C2 (as indicated with directional arrow G) and into rotational driving engagement with the table ring gear 44. Use of such continuous radial thrust eliminates the backlash that would otherwise normally be present as a result of conventional gear spacing to accommodate machining tolerances between gears 42 and 44. However, with such radial thrust, machining errors that do exist between the gears simply result in changes in the centerline distance between the gears. With this arrangement, the drive is adapted to effect changes in direction of rotation of the table with virtually zero table backlash error, and the rigidity of the drive unit between the gears 42 and 44 may be adjusted by adjusting the amount of radial thrust between the gears.

The machine controller, axis drive units, and associated control components control the position, direction, speed, and rotational acceleration of the table, and the position, angular orientation and speed of the tool 18 in a generally conventional manner according to the CNC control program software for the part to be machined during automatic milling operation. Briefly, the controller interprets and processes the program control software, provides output control signals to the axis drive units for positioning and movement of the tool (including the spindle, ram and carrier) and the table, and receives and processes position and speed feedback signals from sensors associated therewith. Suitable sensors and their use are well known, and may include an encoder located under the table 12 on the rotary axis C2 for sensing the position and speed of the table, a sensor positioned in the spindle for sensing the tool position and speed, and suitable rotary and linear sensors located for sensing position of the spindle, ram and carrier. Alternately, for example, tool position and speed of the tool may be approximated through numeric calculation in the controller based on the drive frequency of the spindle, tool motors, and other drive parameters provided to the controller.

In preferred embodiments, the controller 30 software includes a look-ahead capability that anticipates the position, speed and acceleration of the table 12 and the cutting tool 18 at brief instances in the future based on knowing present position, speed and acceleration, anticipated or desired future position, speed and acceleration, signal processing time characteristics, and response time characteristics of the table and cutting tool. With this information, the controller compensates for the table inertia, software block processing time, and other position/speed change parameters, and thus compensates for the time needed to read, process, send and implement signals for changes in table and tool position during machining of the work piece.

The controller look-ahead software logic is implemented generally as follows: during conventional machining of a part, using a machine control software program for the part and the machine operating in automatic (not requiring operator confirmation after each block of code), the CNC reads and executes the program line after line. After completion of one line of code, the following line is executed, and for each line, the controller typically sends an output signal to a particular axis drive unit which in turn causes that axis to move in a certain direction and at a certain speed, moving the table and/or the tool tip along the programmed path. In order to maintain the programmed feed rate and desired accuracy close to optimum, the look-ahead software reads a block of code lines ahead of the then executing line, and automatically adjusts the output signals (from those which would otherwise result from simply executing the code lines) to the axis changing motors in order to avoid violation of the desired part geometry and possible damage to the machine. For example, to machine an internal radius of a desired size, and prevent the tool from overshooting its maximum programmed position in a particular direction, the controller may begin to decelerate one axis prior to the tool reaching the maximum programmed position along that axis, while accelerating the tool in the other axis. Since the machine acceleration rate is finite, the machine needs to make tight turns at a reduced feedrate if the actual tool path is to be allowed to deviate from the programmed tool path only by a predetermined tolerance which can be established at a desired level in the control software. As a result of this control scheme, a very small amount of additional machining stock will be left on the machined inside radius, and a small amount of excess material removed from an external radius, as compared with the programmed radius. However, machining of this excess stock on the inside radius is accommodated in the software with the next pass of the tool, and the absence of machining stock on an external radius is accommodated in the final tool passes. On the other hand, if the controller did not anticipate these directional change requirements, and did not compensate for tool and table/part inertia, software block processing time, and other time response characteristics of the machine, either the tool speed would need to be substantially slowed when executing a change in direction, or the tool would overshoot from the programmed path, removing excess material from inside radii, and in certain instances, presenting the possibility of damage to the tool and other parts of the machine, as well as the part.

In preferred embodiments, the table drive unit 28 also includes an alternate drive arrangement for rotation of the table 12 at a constant speed, without concern for backlash or for changing direction of rotation during machining of a part. In the embodiment shown, this second drive unit comprises an output gear 50 adapted for driving engagement with the table, but operable independently of output gear 42. This is accomplished, for example, by selectively engaging gear 50, and disengaging gear 42 from their associated gear box drives or drive motors, such as with electrically controllable clutches, or by providing for gears movable between engaged and retracted positions, such as movable either radially or vertically with respect to the table, upon receipt of a selection mode signal from the controller 30. Advantageously, the alternate drive unit and output gear 50 are adapted and sized for continuous rotation of the table and work piece 14 for conventional turning operations, typically at a faster continuous speed than what the motor associated with gear 42 would need to be sized for, and avoids the associated wear and complexity of operation when the machine is operating as a turret lathe. And as with conventional turret lathes, the drive motor and drive train associated with the output gear 50 are optionally adapted for speed selection between different settings. Thus, although the drive unit and output gear 42 is capable of providing continuous rotation, with the alternate drive arrangement, drive parameters are optimized for each mode of operation such that the machine 10 is particularly suitable for selective operation as either a conventional turret lathe, or as a precision high-speed milling machine. Advantageously, a head 62 (FIG. 3) provided with a turning tool 64 is connected to the coupling 52 at the end of the ram 16 for operation of the machine as a conventional turret lathe.

It will be apparent to those skilled in the art that alternate milling machine embodiments may be presented within the scope of the present invention. For example, relative positioning between the table 12 and the tool 18 along the Y axis and optionally along the X axis could be implemented by movement of the table, rather than movement of the ram 16. However, it is believed that such an arrangement will not typically be preferred due to the likely higher inertia and resulting greater response time of a typical table. Although the machine 10 is shown with a horizontal table, the table could, of course, be positioned vertical, or otherwise, with the tool position movement and control being adjusted accordingly to maintain the relative operational and control characteristics with the table. And other milling head arrangements may be used with the machine.

Advantageously, the milling machine 10 enables the manufacture of certain parts in less manufacturing time, and/or with improved dimensional control as compared with other prior methods of manufacture of such parts.

Figure 4:
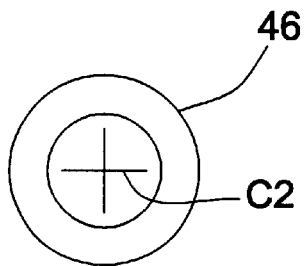
FIG. 4 is an enlarged diagrammatic top view of certain parts in a table drive unit of the machine of FIG. 1.
Figure 4:
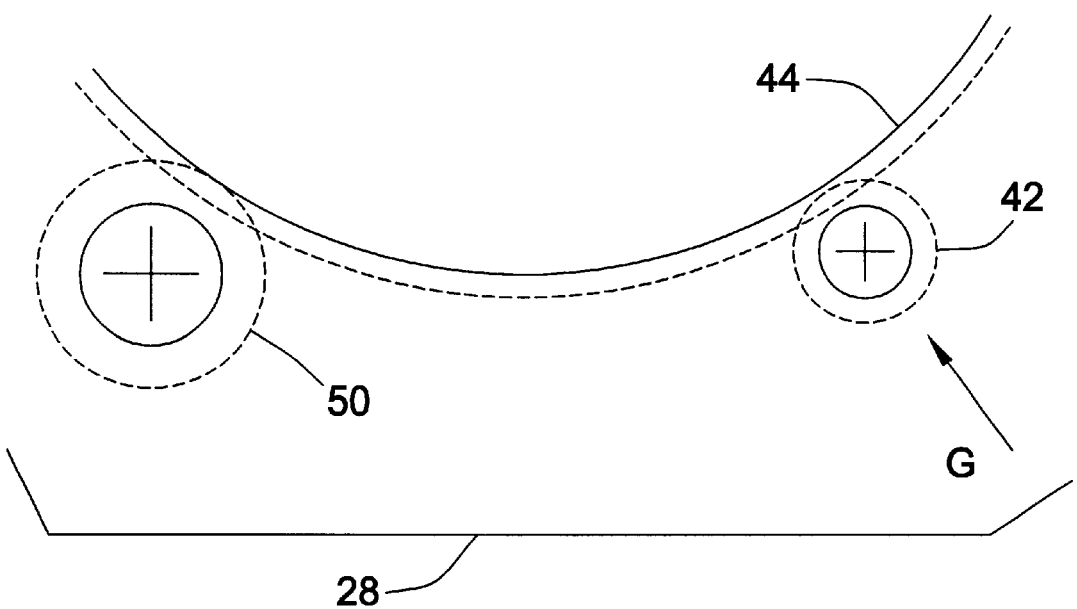
Figure 5:
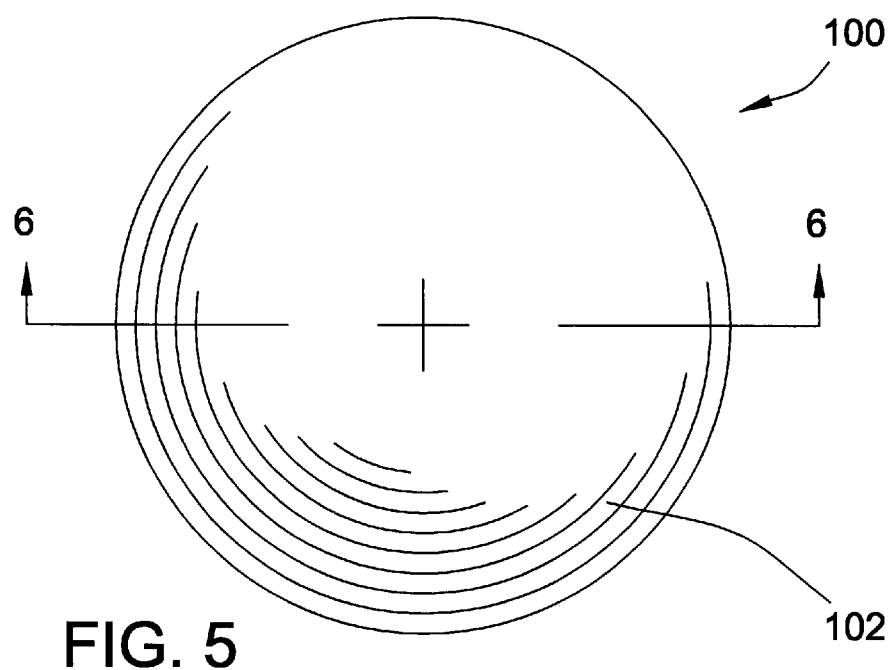
FIG. 5 is a top view of a certain sample part manufactured according to the methods of the present invention.
Figure 6:
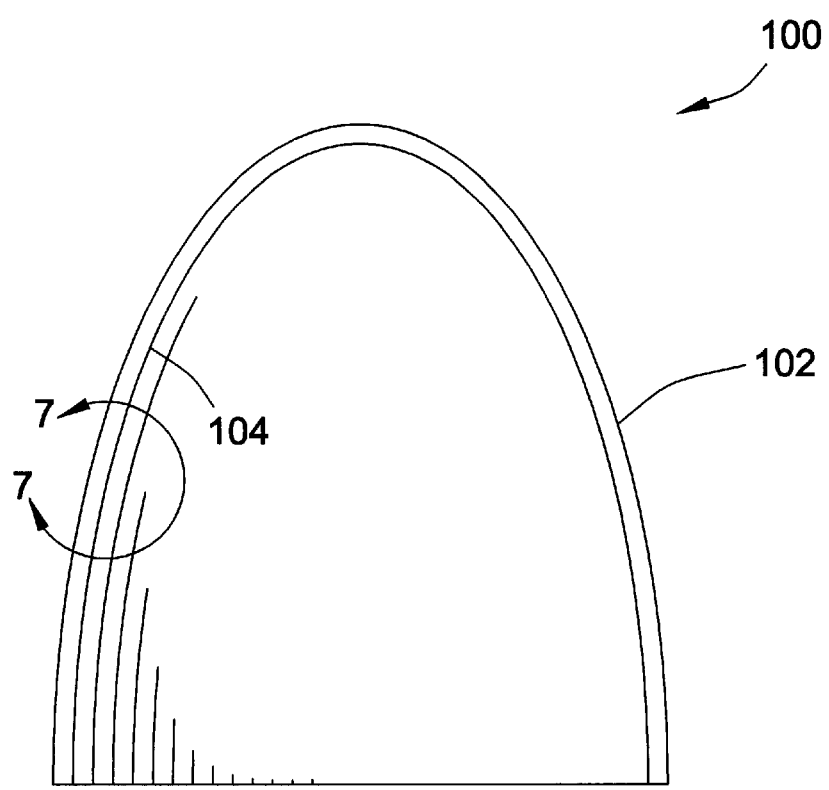
FIG. 6 is a cross-sectional view taken along the line 6—6 of FIG. 5.

By way of example, a dome 100 (FIGS. 4 and 5) of a type which is generally used for the nose of an aircraft or missile, includes a smooth outer surface or wall 102 and an inner isogrid support structure 104 (see FIGS. 6 and 7).

Conventional method of manufacture of such domes includes machining of the isogrid structure into a flat piece of metal, and then forming the machined piece 100A (FIG. 8) around a form or fixture 106 with rollers 108, or with other suitable pressure forming techniques such as generally indicated with arrows "F". The outer surface of the formed wall 102A is then typically turned such as with a turret lathe to its desired outer dimensional profile. Unfortunately, during such forming process, the outer formed wall 102A of the part 100A stretches, and the isogrid structure 104A stretches through its outer portion and compresses through its inner portion. To achieve desired wall thickness in the wall and isogrid structure, this stretching and deformation must be taken into account when machining the isogrid structure in the initial flat piece of metal. In other words, to avoid wall thickness less than desired, the walls must be initially machined to a thickness greater than desired to accommodate the stretching and thinning of the walls. As a result, the wall thickness of the outer wall and the isogrid structure, and the geometry of the isogrid, can not be precisely controlled for size, shape and wall thickness to optimize the finished part for desired configuration and maximum strength at a minimum weight.

Figure 9:
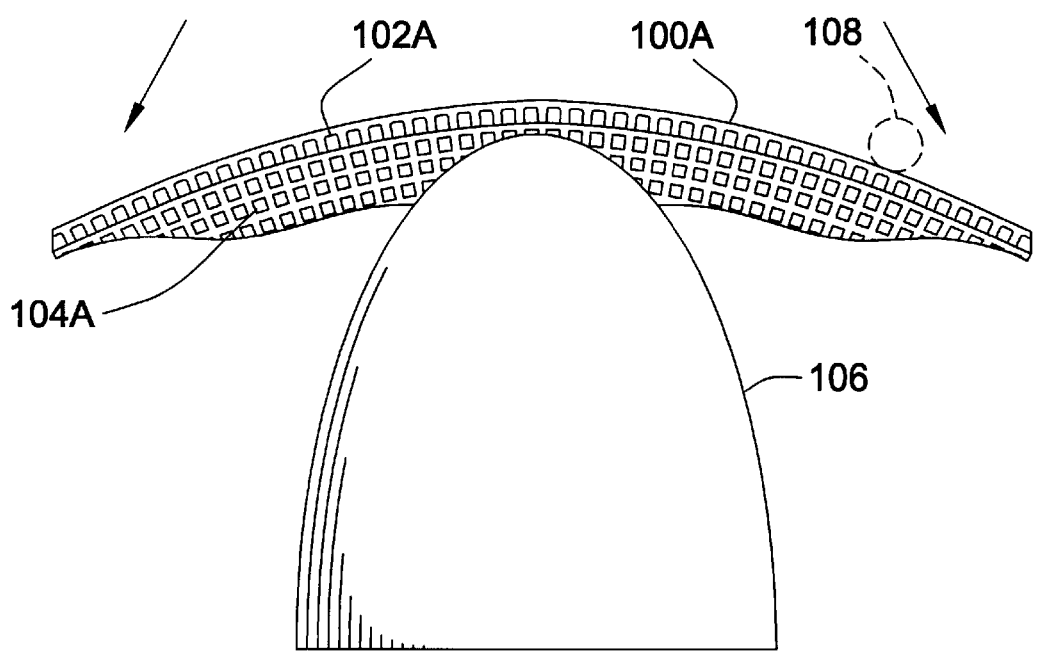
FIG. 9 is a side view illustrating a prior art method of manufacture of the part shown in FIGS. 5 and 6.

In contrast, the dome 100 can be milled with milling machine 10 with precise dimensional control of the size and thickness of wall 102, and the wall thickness and geometry of the isogrid structure 104. In this instance, a flat metal sheet is initially formed over a fixture such as 106 with conventional methods for pre-shaping the interior of the part to the size and shape of the form, and the outer surface proximate its eventual desired size and shape. Machining of the outer surface of wall 102 is accomplished by positioning the pre-formed sheet onto the table 12 such as shown in FIG. 9 and clamping it in place with suitable clamping fixture generally indicated as 10, sweeping the cutting tool 18 through an arc defined by the profile of the desired shape of the outer wall, and incrementally rotating the dome.

Figure 10:
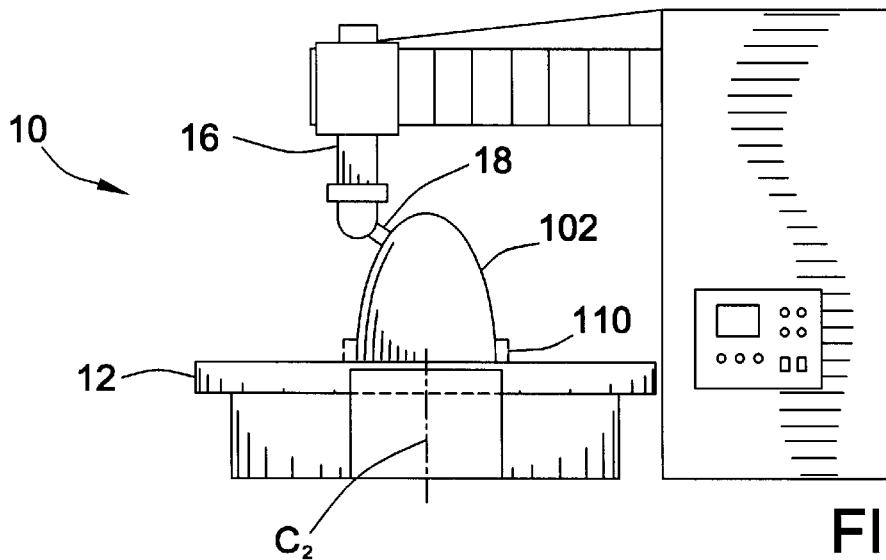
FIGS. 10 and 11 are side views of the machine of FIG. 1, and illustrating the manufacture of the part shown in FIGS. 5 and 6 according to the present invention.
Figure 11:
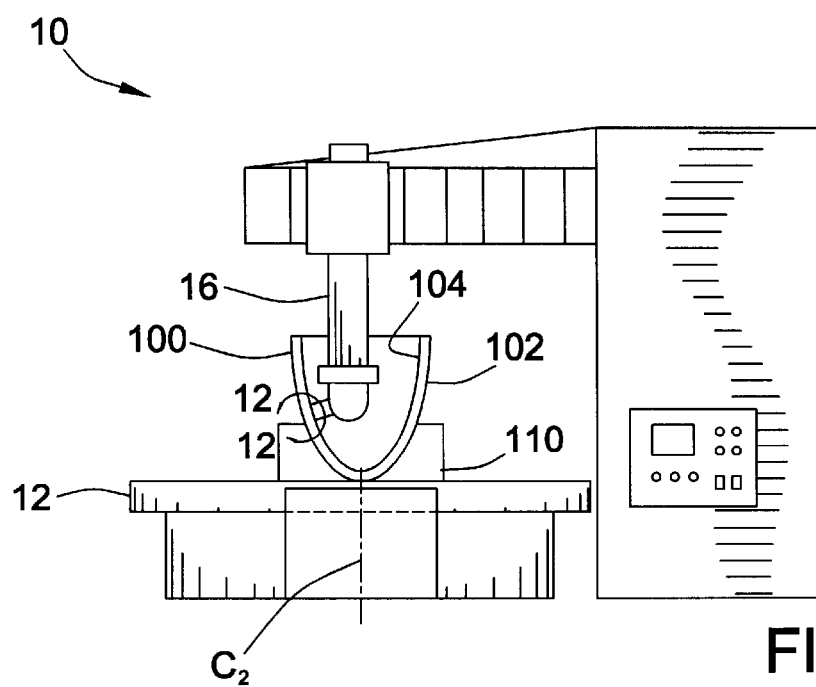

Advantageously, milling the outer surface of wall 102 in this manner generates less machining forces on the wall as compared with turning the outer surface as utilized in prior methods, thus permitting machining of a thinner wall and resulting in a lighter-weight part. The dome is then inverted and clamped on the table such as indicated in FIG. 10, and the isogrid structure is machined with a combination of tool movement and table oscillation and incremental rotation.

As will be apparent, the dome 100 manufactured with precisely controlled dimensions and wall thickness utilizing the machine 10 results in a dome that can be manufactured with increased strength at reduced weight than that which would result from fabrication utilizing prior methods of manufacture such as previously described. Moreover, the present method can reduce the time needed to manufacture the dome as compared with prior methods because (1) high-speed milling is capable of generating the outer profile of the dome faster than turning the profile on a turret lathe, and (2) forming of the dome in a flat sheet, prior to machining the isogrid structure enables that forming process to proceed relatively quickly and without tight forming process controls as compared with the forming processes of prior methods required to control stretching and deformation of wall thickness to within established limits.

Figure 12:
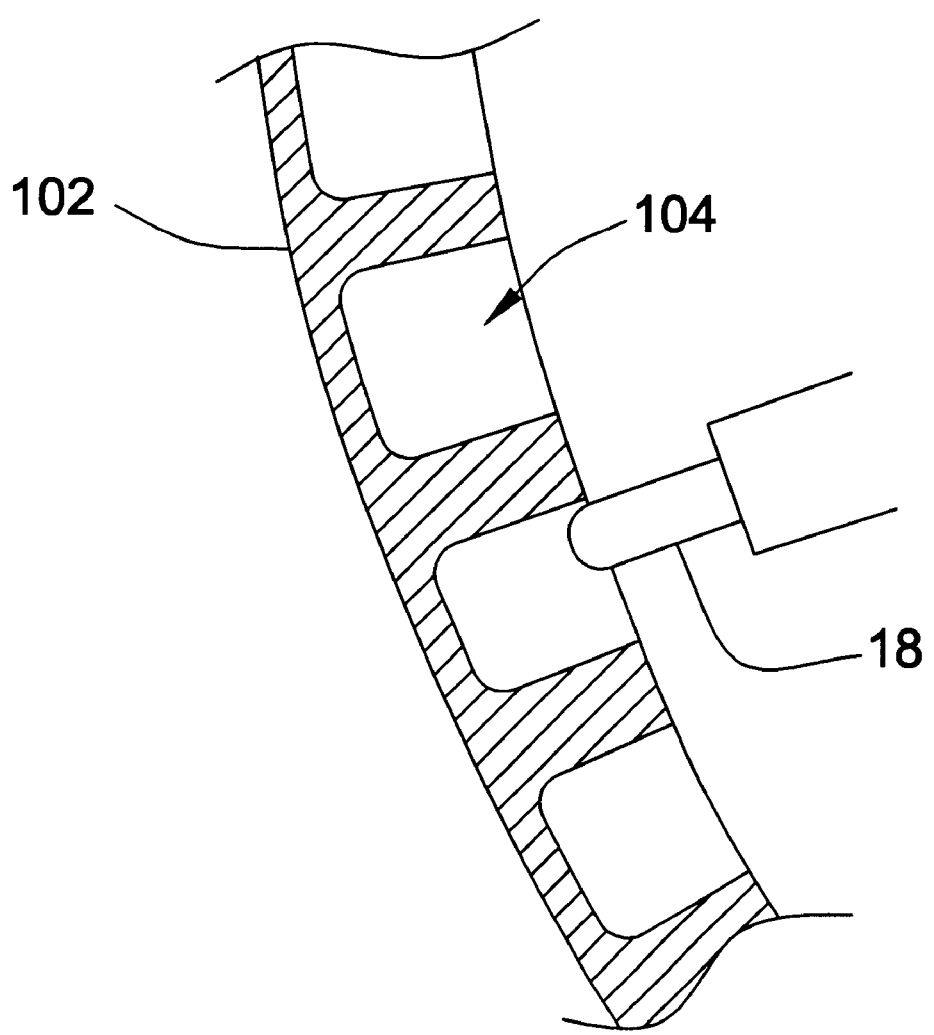
FIG. 12 is an enlarged fragmentary side view taken as generally indicated at line 12—12 of FIG. 11.

As another example, a second dome part dome 130 is shown in FIG. 12. In this instance, the dome is formed with relatively thick reinforcing bands 132 at 90 degrees from one another, relatively thin walls 134 therebetween, and a flange 136 that includes an isogrid structure 138 machined therein. Prior methods of manufacturing dome 130 include forming portions of the dome individually, either with castings or other machining and forming techniques, and joining the individual portions together such as with welding. On the other hand, utilizing the rotary, oscillatory positioning capability of the table 12, and the positioning capability of the tool about the A and C1 axes, the dome 130, including transitioning radii such as 140, can be efficiently milled as a single part, providing for precise dimensional control with increased strength at reduced weight.

Figure 13:
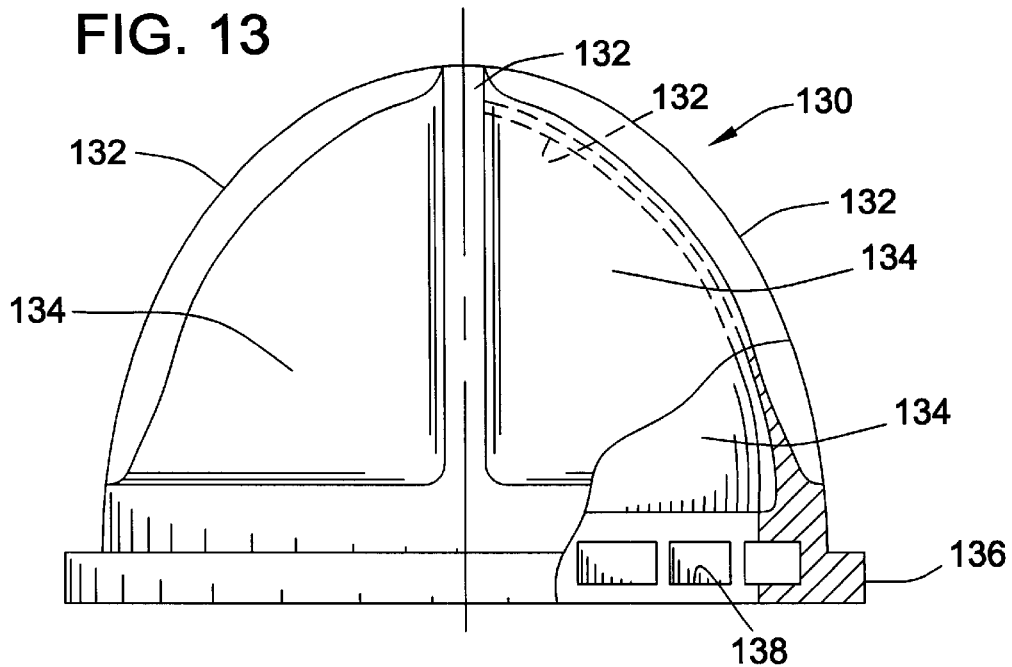
FIG. 13 is a side view of a second sample part manufactured according to the invention, with portions being broken away and shown in cross-section.
Figure 14:
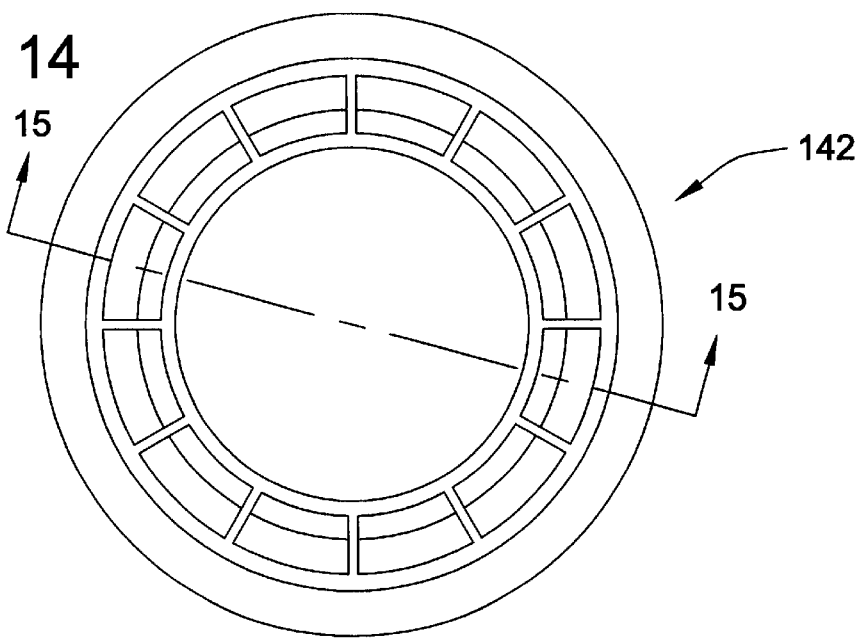
FIG. 14 is a top view of a third sample part manufactured according to the invention.
Figure 15:
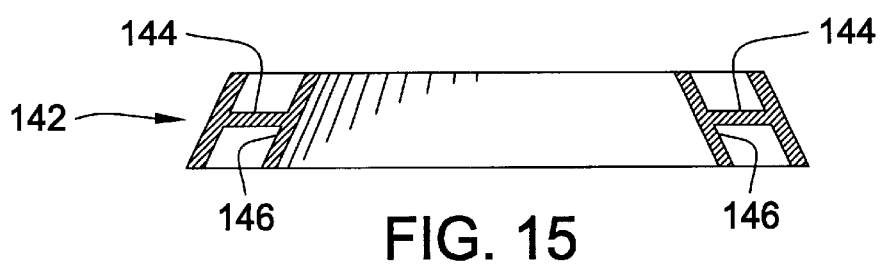
FIG. 15 is a cross-sectional view taken along the line 15—15 of FIG. 14.

As a third example, it is apparent that the truncated dome-shaped ring 142 illustrated in FIGS. 13 and 14 can not be efficiently machined with prior milling machines because the cutting tool of such machines can not reach into the outer and inner corners 144 and 146 of the upper and lower pockets, respectively. Whereas, the capability of rotating the tool about axis A, combined with the table positioning capability of the machine 10 permits efficient milling of all corners and surfaces of such parts.

It will be apparent to those skilled in the art that many other parts will benefit from manufacture with the machine 10, i.e., parts for which precise dimensional control is desired, but could not be efficiently manufactured with prior milling machines, and were thus previously manufactured with other processes. As such, milling of relatively large, substantially thin-walled structures, being substantially rounded and somewhat symmetric, and such as may have been formed from multiple pieces during prior manufacturing processes, and which are particularly characterized by having substantially circumferentially extending surface portions interrupted by substantially radially extending wall portions as in the parts previously discussed, will benefit from milling according to the invention.

From the foregoing, it will be apparent that the present invention brings to the art a new and improved milling machine 10 provided with a bi-directional rotary/oscillatory workpiece-holding table 12 and a high-speed motorized tool spindle 24 with angular and rotary position control capability. As a result, the machine is capable of manufacture, with precise dimensional control, certain relatively complex parts which could not be manufactured with prior milling machines, and which could not be manufactured to such dimensional control using prior methods of manufacture. And by virtue of a dual table drive and interchangeable tool holder, the machine 10 is also suitable for use as a conventional turret lathe.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A CNC milling machine comprising:

a frame structure;

a table rotatably connected to the frame structure for rotation about a first axis extending therethrough;

bi-directional, variable speed, first table power drive means for positioning, oscillating and rotating the table about said first axis;

a carrier connected to the frame structure for power-controlled movement along a second axis, said second axis being perpendicular to said first axis;

a ram connected to the carrier for power-controlled movement along a third axis, said third axis extending parallel to said first axis, said ram having a free end portion;

a motorized first spindle connected to the free end portion of the ram for power-controlled pivoting about a fourth axis, said fourth axis being perpendicular to said first axis;

a cutting tool mounted in the spindle for power-cutting rotation and for pivoting therewith about said fourth axis; and control means including a closed loop CNC controller operatively connected to the table power drive means, the carrier, the ram, and the motorized spindle for controlling positioning and movement thereof on the respective associated axes;

said control means including (i) sensor means for sensing the position, speed and direction of rotation of the table and for providing an output feedback signal indicative thereof to the controller, and (ii) feedback means for determining the position of the spindle and tool about said second horizontal axis.

2. The machine as defined in claim 1 in which said spindle is further adapted for rotation about said third axis.

3. The machine as defined in claim 1 further comprising a second spindle and a coupling for releasably connecting one of said first and second spindles to the free end portion of the ram.

4. The machine of claim 3 further adapted for optional operation as a turret lathe, said machine further comprising a second table power drive means for rotating the table about said first axis, and means for selectively engaging and controlling one of said first and second table drive means.

5. The machine as defined in claim 1 in which said feedback means includes sensor means for sensing the position of the tool about said fourth axis and for providing an output feedback indicative thereof to the controller.

6. The machine of claim 1 further comprising means for reducing backlash during oscillation and changes of direction of table rotation.

7. The machine of claim 1, wherein said table is further translatably connected to the frame structure for linear translation along the first axis.

\* \* \* \* \*